US012577705B2

(12) United States Patent
Ketterer et al.

(10) Patent No.: US 12,577,705 B2
(45) Date of Patent: Mar. 17, 2026

(54) ASSEMBLY COMPRISING A CENTER-FLUID DISTRIBUTOR AND A MULTI-FIBER SPINNERET

(71) Applicant: GAMBRO LUNDIA AB, Lund (SE)

(72) Inventors: Markus Ketterer, Schramberg (DE); Carl-Philipp Scheuermann, Balingen (DE); Juergen Graf, Dormettingen (DE)

(73) Assignee: GAMBRO LUNDIA AB, Lund (SE)

( * ) Notice: Subject to any disclaimer, the term of this patent is extended or adjusted under 35 U.S.C. 154(b) by 434 days.

(21) Appl. No.: 18/245,558

(22) PCT Filed: Sep. 21, 2021

(86) PCT No.: PCT/EP2021/075862
§ 371 (c)(1),
(2) Date: Mar. 16, 2023

(87) PCT Pub. No.: WO2022/058602
PCT Pub. Date: Mar. 24, 2022

(65) Prior Publication Data
US 2023/0366127 A1    Nov. 16, 2023

(30) Foreign Application Priority Data
Sep. 21, 2020    (EP) .................................... 20197246

(51) Int. Cl.
| | |
|---|---|
| *D01D 5/24* | (2006.01) |
| *B01D 69/08* | (2006.01) |
| *D01D 1/09* | (2006.01) |
| *D01D 4/06* | (2006.01) |

(52) U.S. Cl.
CPC ............. *D01D 5/24* (2013.01); *B01D 69/088* (2013.01); *D01D 1/09* (2013.01); *D01D 4/06* (2013.01); *B01D 2323/42* (2013.01); *B01D 2323/50* (2013.01); *B01D 2323/60* (2022.08); *D10B 2331/14* (2013.01)

(58) Field of Classification Search
None
See application file for complete search history.

(56) References Cited

U.S. PATENT DOCUMENTS

| | | | | |
|---|---|---|---|---|
| 6,336,801 | B1 * | 1/2002 | Fish ..................... | D01D 5/0985 |
| | | | | 425/7 |
| 2003/0155673 | A1 * | 8/2003 | Zikeli ....................... | D01F 2/00 |
| | | | | 425/382.2 |
| 2022/0339585 | A1 * | 10/2022 | Buck ........................ | D01D 5/24 |
| 2023/0082772 | A1 * | 3/2023 | Schütt .................... | B29C 48/05 |
| | | | | 425/113 |

FOREIGN PATENT DOCUMENTS

| | | |
|---|---|---|
| DE | 3022313 | 12/1980 |
| EP | 3581373 | 12/2019 |
| EP | 3842132 | 6/2021 |

OTHER PUBLICATIONS

PCT Search Report and Written Opinion prepared for PCT Application No. PCT/EP2021/075862, completed Dec. 21, 2021.

* cited by examiner

*Primary Examiner* — Krishnan S Menon

(74) *Attorney, Agent, or Firm* — Barnes & Thornburg LLP

(57)    ABSTRACT
The present disclosure relates to a center fluid distributor for a multi-fiber spinneret for producing hollow fiber membranes in a phase inversion process.

13 Claims, 2 Drawing Sheets

A-A (2 : 1)

A-A (2 : 1)

ASSEMBLY COMPRISING A CENTER-FLUID DISTRIBUTOR AND A MULTI-FIBER SPINNERET

CROSS-REFERENCE TO RELATED APPLICATIONS

This application is a national stage entry under 35 U.S.C. § 371 (b) of PCT International Application No. PCT/EP2021/075862, filed Sep. 21, 2021, which claims the benefit of European Patent Application Serial No. 20197246.0, filed on Sep. 21, 2020, the entire disclosures of both of which are incorporated herein by reference.

TECHNICAL FIELD

The present disclosure relates to a center fluid distributor for a multi-fiber spinneret for producing hollow fiber membranes in a phase inversion process.

BACKGROUND OF THE INVENTION

Semipermeable hollow fiber membranes for application in medical devices, e.g., capillary dialyzers and capillary filters, are mostly manufactured using a phase inversion process. Spinnerets having a nozzle with two concentric orifices, an outer ring slit and a central bore, are commonly used. A polymer solution is extruded through the outer ring slit of the nozzle into a precipitation bath, and simultaneously a center fluid is extruded through the inner bore of the nozzle. The center fluid is provided to the spinneret at a predetermined pressure to generate a constant flow of center fluid through the nozzle. The exact volume flow of center fluid is important in order to produce hollow fibers having the desired dimensions.

Spinning units for the production of hollow fiber membranes usually comprise a large number of individual spinnerets and simultaneously produce several hundred hollow fiber membranes. In order to reduce installation space required by the spinnerets, multi-fiber spinnerets, i.e., spinnerets comprising multiple nozzles in a single spinneret housing, have been proposed. A twin spinneret has been disclosed in co-pending European patent application No. 19219557.6.

Each nozzle in a multi-fiber spinneret has to be connected to a supply of center fluid providing a constant flow. So, for a twin spinneret comprising two nozzles, two center fluid connectors are required; for a spinneret comprising three nozzles, three center fluid connectors are required, and so on. Because of the limited space in the spinning machine, this is difficult to achieve.

On the other hand, when all nozzles of a multi-fiber-spinneret are supplied with center fluid from a single connector, the center fluid flow varies between the individual nozzles. This is due to the manufacturing tolerance of the bore diameter in the nozzles, resulting in uneven distribution of the flow of center fluid between the nozzles. As a result, the hollow fiber membranes produced by the individual nozzles of the multi-fiber spinneret do not have the same inner diameter.

It is an objective of the present disclosure to provide a center fluid distributor for a multi-fiber spinneret which allows for a precise control of the volume flow of a center fluid through the nozzles of the multi-fiber spinneret and has a compact design.

EP 3 581 373 A1 discloses a spinneret, apparatus, and method for making filaments for fibrous nonwoven fabrics.

The spinneret has a spinneret body that has an overall length to hydraulic diameter ratio and defines orifices that extend through the spinneret body, wherein the orifices comprise capillaries that open at a face of the spinneret body for polymer filament extrusion therefrom, wherein the capillaries are arranged in a plurality of different rows at the face of the spinneret body, and wherein the plurality of different rows are arranged into a plurality of different zones at the face of the spinneret body. A spinneret body of the spinneret can have an overall length to hydraulic ratio of at least 3 percent and/or a zone-to-zone length to hydraulic ratio of at least 2% and/or the hydraulic diameters, lengths, and length to hydraulic diameter ratios can progressively increase or decrease zone-to-zone for at least three different zones of capillaries, which can be applied to cross-flow quench or quench from a single-side. The spinneret body is designed to better accommodate differing operational proximity of the various different zones to quench air sources or source at commercially useful throughputs and fiber uniformity.

WO 2020/097183 A1 discloses spunbond fiber nonwoven webs and methods for making the same. A spinneret having a length, a width and a thickness and further having a plurality of conduits extending through the thickness of the spinneret is used, said conduits having an inlet opening in an upper surface of the spinneret and an exit orifice in a lower surface of the spinneret and further having a capillary in fluid communication with said inlet opening and exit orifice.

US 2002/195737 A1 discloses an apparatus and method for spinning hollow bicomponent filaments. The apparatus includes a distributor, a spinneret having holes and a shim having openings fixed between the distributor plate and the spinneret. The distributor supplies a first polymer having an MV to a first part of the spinneret holes and a second polymer having a lower MV to a recessed section of the spinneret. The shim openings are positioned above the spinneret holes and extend away from the first part of the holes to allow the second polymer to flow from the recessed section, through the shim openings, to a second part of the spinneret holes. The two polymers travel along the opposed first and second parts of the holes until exiting the spinneret through respective asymmetric C-shaped apertures. The apertures are sized so that hydraulic split does not occur between the polymers and consequently potential filament kneeing is obviated. Upon exiting the apertures, the polymers self-join to form hollow filaments and are quenched. Since the polymers have different MV properties, the filaments self-crimp into a spiral configuration.

DE 30 22 313 A1 discloses hollow fibers with a number of separate hollow sections extending through the whole length of the fiber, so that there is a through passage, constituting a semi-permeable, multiple, hollow fiber. A spinneret for producing the semipermeable hollow fiber has several independent openings for injecting a first liquid and a corresponding number of annular slots which surround the individual openings. The annular slots are connected to one another to form a continuous slot for the extrusion of a fiber-forming material.

SUMMARY OF THE INVENTION

A center fluid distributor for a multi-fiber spinneret is provided that allows for a precise control of the volume flow of a center fluid through the individual nozzles of the multi-fiber spinneret. The center fluid distributor saves installation space otherwise required for multiple center fluid flow control units.

SHORT DESCRIPTION OF THE DRAWINGS

DETAILED DESCRIPTION

Figure 1:
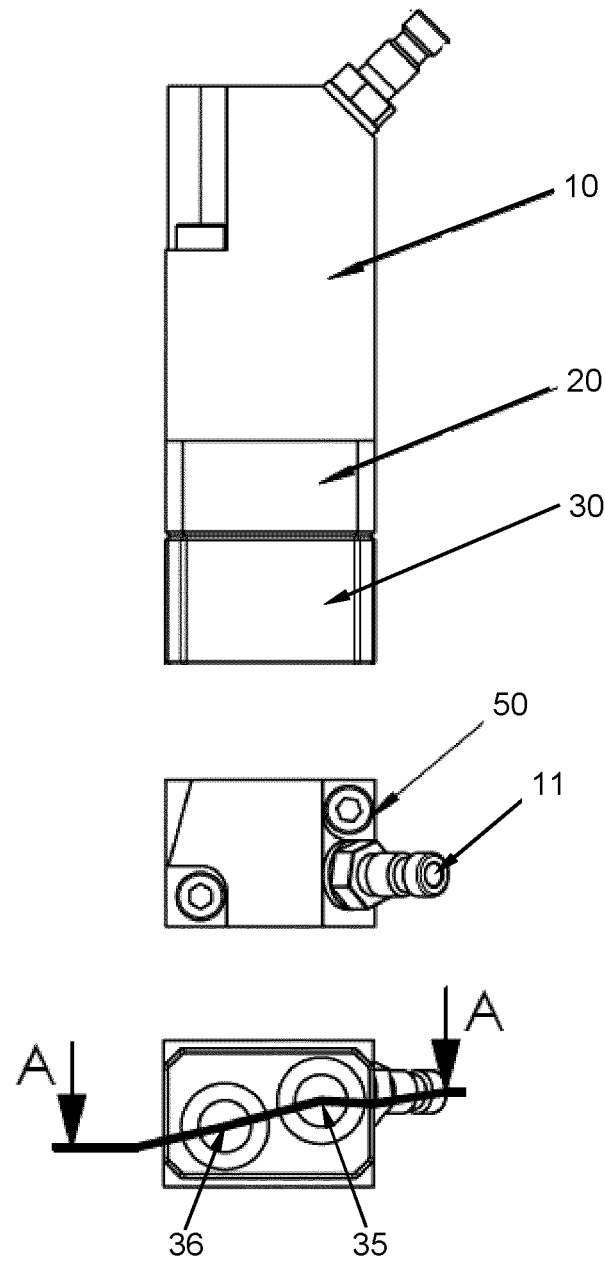
FIG. 1 shows a side view, a top view, and a bottom view of a twin spinneret with an embodiment of the center fluid distributor of the present disclosure.

The present disclosure provides a center fluid distributor that allows for a precise control of the volume flow of a center fluid through the nozzles of a multi-fiber spinneret. The center fluid distributor can be mounted on the multi-fiber spinneret and saves installation space otherwise required for multiple center fluid flow control units.

The present disclosure also provides an assembly for the production of hollow fiber membranes which encompasses the center fluid distributor and a multi-fiber spinneret.

In the context of the present disclosure, the term "multi-fiber spinneret" is used for a spinneret comprising a plurality of nozzles, each with two concentric orifices, in a single spinneret housing, capable of simultaneously producing multiple hollow fiber membranes. In one embodiment, the multi-fiber spinneret is a twin spinneret comprising two nozzles. In other embodiments, the multi-fiber spinneret comprises more than two nozzles, e.g., three to twelve nozzles.

The center fluid distributor of the present disclosure comprises a single inlet port for a center fluid and at least two capillaries in fluid communication with the inlet port.

The orifices of the at least two capillaries define outlet ports for the center fluid, and are configured to distribute a flow of center fluid provided at the inlet port between the outlet ports in such a manner that, when the outlet ports are connected to center fluid needles providing an central orifice of a nozzle of a multi-fiber spinneret comprising at least two nozzles, the flow rate through all the center fluid needles of the multi-fiber spinneret is the same.

The center fluid distributor of the present disclosure solves the problem of uneven center fluid flow distribution between the individual nozzles of a multi-fiber spinneret due to the manufacturing tolerance of the bore diameter (the inner diameter of the central orifice) in the nozzles. Center fluid flow through all nozzles of a multi-fiber spinneret is equalized. This is achieved by placing capillary tubes upstream of each nozzle of the multi-fiber spinneret. The lengths of these tubes are adjusted to achieve the same center fluid flow through each nozzle, e.g., by cutting the capillary tubes to length. In the context of the present disclosure, the center fluid flow is considered to be the same through all nozzles, if the ratio of the center fluid flows through any two of the nozzles is in the range of from 0.95 to 1.05. The capillary tubes are arranged within a housing which is directly mounted on the multi-fiber spinneret. The center fluid distributor ensures constant center fluid flow and therefore constant inner diameter of the hollow fiber membranes produced. The hydraulic properties of the center fluid distributor are fixed, so that heat, vibrations, or long-term use are unlikely to change the hydraulic properties and, consequently, the inner diameters of hollow fibers produced by the multi-fiber spinneret.

The center fluid distributor of the present disclosure only requires a single connection to a source of a constant flow of center fluid to supply all nozzles of a multi-fiber spinneret. Therefore, it only features a single inlet port for a center fluid and a plurality of outlet ports for the center fluid, each outlet port being defined by the orifice of a capillary in fluid communication with the inlet port. The center fluid distributor comprises at least two outlet ports. In one embodiment, the center fluid distributor comprises two outlet ports. In other embodiments, the center fluid distributor comprises three to twelve outlet ports. The capillaries in the center fluid distributor control the liquid flow through the center fluid distributor. The capillaries are configured to distribute a flow of center fluid provided at the inlet port of the center fluid distributor between the outlet ports of the center fluid distributor in such a manner that, when the outlet ports are connected to center fluid needles providing central orifices of the nozzles of a multi-fiber spinneret comprising at least two nozzles, the flow rate through all the center fluid needles of the multi-fiber spinneret is the same. In the context of the present disclosure, the flow rate is considered to be the same through all the center fluid needles, if the ratio of the flow rates through any two of the center fluid needles is in the range of from 0.95 to 1.05. The length of each capillary is adjustable to offset differences in flow capacity between the individual center fluid needles caused by differences in the dimensions of the individual center fluid needles. In one embodiment, the dimensions of the individual capillaries are adjusted to equally distribute the liquid flow between the center fluid needles of the multi-fiber spinneret connected to the center fluid distributor, e.g. by cutting individual capillaries to length, or by replacing individual capillaries by longer or shorter capillaries as required.

In one embodiment, each capillary is arranged within a housing that is configured to be connected to a center fluid inlet of a nozzle of a multi-fiber spinneret comprising at least two nozzles.

In one embodiment, each housing is connected to a spinneret insert of the multi-fiber spinneret. The spinneret insert comprises a chamber for center fluid and a hollow needle connected to the base of the chamber and providing a central orifice of a nozzle of the multi-fiber spinneret.

In one embodiment, the housing comprises a first housing part arranged in a bore in the basal face of the center fluid distributor, and a second housing part connected to the first housing part and at least partly protruding from the bore. In a further embodiment, a sealing element, e.g., a ferrule, is arranged around the capillary between the first housing part and the second housing part and provides a fluid-tight seal.

The present disclosure also provides an assembly comprising the center fluid distributor of the present disclosure mounted on a multi-fiber spinneret comprising at least two nozzles.

The center fluid distributor comprises a number of capillaries corresponding to the number of nozzles present in the multi-fiber spinneret. The capillaries are in fluid connection with a single feed port for center fluid of the center fluid distributor. Each capillary is in fluid communication with the central orifice of one of the nozzles of the multi-fiber spinneret, so that the central orifice of each nozzle can be supplied with center fluid via the corresponding capillary in the center fluid distributor. The central orifice is provided by a center fluid needle. The capillaries in the center fluid distributor are configured to equally distribute a flow of center fluid between the center fluid needles (i.e., the central orifices of the nozzles) of the multi-fiber spinneret.

In one embodiment, an adapter is present between the center fluid distributor and the multi-fiber spinneret, joining the center fluid distributor to the multi-fiber spinneret. The adapter provides additional mechanical stability to the assembly. In an embodiment of the assembly of the present disclosure, each capillary of the center fluid distributor is arranged within a housing, and a part of each housing protrudes from the basal face of the center fluid distributor. The protruding part of each housing is plugged into a center fluid inlet of the multi-fiber spinneret. The adapter provides sleeves for receiving the protruding part of each housing and pockets for receiving center fluid inlets of the multi-fiber spinneret.

In one embodiment, the multi-fiber spinneret is comprised of two separate kinds of building blocks, a spinneret body and multiple spinneret inserts, which are assembled to form the multi-fiber spinneret. The spinneret body features orifices in its upper side. The orifices open into a cavity of the spinneret body and a spinneret insert has been introduced into the cavity through each orifice. The multi-fiber spinneret thus comprises a spinneret body and at least two spinneret inserts arranged within a cavity of the spinneret body.

In one embodiment, the multi-fiber spinneret is a twin spinneret, i.e., the spinneret body features two orifices for a spinneret insert.

The first building block, the spinneret body, defines an outer wall of a compartment for a polymer solution and an outer wall of a ring slit of the nozzles of the multi-fiber spinneret located in the bottom face of the spinneret body. The spinneret body features a feed port for a polymer solution which connects to a compartment for a polymer solution in the multi-fiber spinneret defined by the inner surface of the cavity of the spinneret body and the outer surface of the spinneret inserts. The compartment encompasses a plurality of rotationally-symmetrical shells around the spinneret inserts which are interconnected by tubular ducts in the spinneret body.

The nozzles of the multi-fiber spinneret feature two concentric orifices, an outer ring slit and a central orifice. The outer ring slit of each nozzle is connected to a compartment for a polymer solution in the multi-fiber spinneret, the central orifice of each nozzle is formed by a hollow needle present in the spinneret insert.

The second kind of building block, the spinneret insert, defines part of the inner wall of the compartment for a polymer solution and comprises a chamber for a center fluid connected to a hollow needle which extends to one of the nozzles in the spinneret body when the multi-fiber spinneret is assembled. The hollow needle also defines a central orifice and an inner wall of the ring slit of the corresponding nozzle of the multi-fiber spinneret.

The present disclosure also provides a method of calibrating the assembly of the present disclosure. The feed port for center fluid of an assembly comprising the center fluid distributor of the present disclosure mounted on a multi-fiber spinneret is connected to a source of a constant flow of a liquid. In one embodiment, the liquid is a center fluid. In another embodiment, the liquid is water.

A flow rate of the liquid through each needle (i.e., through each nozzle) of the multi-fiber spinneret is measured and the measured flow rates are compared to each other. If the ratio of the measured flow rates is in the range of from 0.95 to 1.05, the flow rates are considered to be identical. If the flow rates are not identical, the lengths of the capillaries in the center fluid distributor are adjusted to eliminate the differences and achieve identical flow rates through all needles. The adjustment can be performed by reducing the length of individual capillaries, e.g., by cutting, or by replacing individual capillaries by longer or shorter capillaries, as required in each case.

Flow rates through all needles then are measured again to verify that the flow rates are identical. If the flow rates still are not identical, the process is repeated until the flow rates through all needles of the multi-fiber spinneret are identical.

The calibration procedure is performed prior to the first use of the assembly in the production of hollow fiber membranes. It only has to be performed once, unless parts of the assembly have to be replaced at a later point in time, e.g., due to repairs. For example, if one of the spinneret inserts or one of the center fluid needles is replaced, recalibration of the assembly is necessary, to ensure constant inner diameter of the hollow fiber membranes produced.

The present disclosure also provides a process for the production of hollow fiber membranes, comprising feeding a polymer solution to the feed port for a polymer solution of the multi-fiber spinneret of the assembly of the present disclosure, simultaneously feeding a center solution to a feed port for a center fluid of the center fluid distributor of the assembly, extruding the polymer solution through the outer ring slits of the nozzles of the of the multi-fiber spinneret, and simultaneously extruding the center fluid through the center fluid needles of the multi-fiber spinneret.

Suitable polymer solutions and suitable center fluids for the production of semipermeable hollow fiber membranes are well known in the art. For instance, a solution comprising 1) at least one polysulfone, polyethersulfone, or polyarylethersulfone, and 2) at least one polyvinylpyrrolidone may be used as the polymer solution. In one embodiment, the at least one polysulfone, polyethersulfone, or polyarylethersulfone, and the at least one polyvinylpyrrolidone are dissolved in 3) a mixture of N-methyl-2-pyrrolidone (NMP) and water. In one embodiment, the center fluid comprises water and N-methyl-2-pyrrolidone. In a further embodiment, a mixture of water and NMP is used as the center fluid.

The center fluid distributor and the assembly of the present disclosure will now be further explained by referring to the accompanying figures.

FIG. 1 shows a side view (top), a top view (middle), and a bottom view (bottom) of an embodiment of the center fluid distributor 10 of the present disclosure mounted on a twin spinneret 30 comprising two nozzles 35, 36. The center fluid distributor 10 is joined to the twin spinneret 30 by an adapter 20. The center fluid distributor 10 features a single inlet port 11 for connection to a source of a constant flow of center fluid (not shown). The center fluid distributor 10 is mounted on the spinneret 30 with screws 50.

Figure 2:
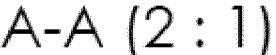
FIG. 2 is a sectional view along line A-A of the assembly shown in FIG. 1.

FIG. 2 is a sectional view along line A-A of the assembly shown in FIG. 1. The constant flow of center fluid enters the center fluid distributor 10 at the inlet port 11 (connector). The center fluid is then distributed in the center fluid distributor 10 through bores 12. The center fluid subsequently flows through capillaries 15, 16 (nominal inner diameter of the capillaries is about 200 µm, length is roughly 40 mm) into center fluid chambers 42, 47 and then through center fluid needles 41, 46 (inner diameter of the needles is about 170 µm, length is roughly 4 mm) of the spinneret inserts 40, 45.

The capillaries 15, 16 are held within a capillary housing formed by a first housing part 13, a second housing part 21 and a ferrule 14 arranged between the first housing part 13 and the second housing part 21 as a seal to block bypass of liquid. The second housing part 21 is plugged into a center fluid inlet 43, 48 of a spinneret insert 40, 45.

The adapter 20 joins the center fluid distributor 10 to the multi-fiber spinneret 30. The adapter 20 provides sleeves 25 for receiving the part of the second housing parts 21 protruding from the basal face of the center fluid distributor 10. The adapter also provides pockets 26 for receiving the part of the spinneret inserts 40, 45 protruding from the spinneret body 31. The protruding part comprises the center fluid inlets 43, 48 of the spinneret inserts 40, 45. The adapter 20 protects the protruding parts from damage and provides additional mechanical stability to the assembly.

O-Rings 22 provide a seal between the center fluid distributor 10, the second housing part 21, and the adapter 20. O-Rings 23 provide a seal between the adapter 20, the second housing part 21, and the spinneret inserts 40, 45. O-Rings 24 provide a seal between the second housing part 21, the center fluid inlets 43, 48 of the spinneret inserts 40, 45, and the center fluid chambers 42, 47 of the spinneret inserts 40, 45.

The diameter of the bores 12 in the center fluid distributor is so large that the hydraulic resistance of the bores 12 is negligible in comparison to the hydraulic resistance of the capillaries 15, 16 and the needles 41, 46. The nominal center fluid flow through each spinneret insert 40, 45 is about 2.0 ml/min, and the flow is laminar.

The flow ratio of the center fluid flows through the spinneret inserts 40, 45 can be described as follows:

$$\frac{\dot{V}_A}{\dot{V}_B} = \left( \frac{\frac{l_{DK,B}}{r^4_{DK,B}} + \frac{l_{D,B}}{r^4_{D,B}}}{\frac{l_{DK,A}}{r^4_{DK,A}} + \frac{l_{D,A}}{r^4_{D,A}}} \right) = C_A$$

wherein $\dot{V}$ is the volume flow; l is the length of either a capillary 15, 16 (DK) or a needle 41, 46 (D); and r is the inner radius of a capillary 15, 16 or needle 41, 46. Index A refers to the first spinneret insert 40, the first needle 41, and the first capillary 15, respectively. Index B refers to the second spinneret insert 45, the second needle 46, and the second capillary 16, respectively.

The twin spinneret 30 is tested on a testing rig together with the center fluid distributor 10 mounted on it. Flow rate through each needle 41, 46 of the spinneret 30 is then measured with a constant flow of distilled water. Lengths $l_{DK,A}$, $l_{DK,B}$ of capillaries 15 and 16, respectively, then are adjusted according to the deviation of the measured flow rates from each other. Flow rates then are measured again to check on the improvements. If necessary, the process is repeated until the flow rates through both needles 41, 46 are identical, i.e. $C_A$=1 (±0.05).

The spinneret inserts 40, 45 are arranged within a cavity 33 of the body 31 of the twin spinneret 30. The spinneret body 31 features an inlet 32 for a polymer solution and two nozzles 35, 36 at its bottom. Each nozzle 35, 36 comprises a circular orifice at the base of cavity 33. The needles 41, 46 of the spinneret inserts 40, 45 each extend into a nozzle 35, 36, defining a central orifice of the nozzle 35, 36 and the inner boundary of the outer ring slit of the nozzle 35, 36. The cavity 33 comprises a duct 34. The cavity 33 and the outer surface of the spinneret inserts 40, 45 together define a chamber for a polymer solution. During operation of the spinneret 30, a polymer solution is extruded through the outer ring slit of the nozzles 35, 36, and a center fluid simultaneously is extruded through the central orifice of the nozzles 35, 36 formed by needles 41, 46, to form a hollow fiber membrane.

LIST OF REFERENCE SIGNS

10 center fluid distributor
11 feed port for center fluid
12 bore

13 first capillary housing part
14 ferrule
15 first capillary
16 second capillary
17 washer
20 adapter
21 second capillary housing part
22 O-ring
23 O-ring
24 O-ring
25 sleeve
26 pocket
30 spinneret
31 spinneret body
32 polymer solution port
33 cavity
34 polymer solution duct
35 first nozzle
36 second nozzle
40 first spinneret insert
41 first spinneret insert needle
42 first center fluid chamber
43 first spinneret insert center fluid inlet
45 second spinneret insert
46 second spinneret insert needle
47 second center fluid chamber
48 second spinneret insert center fluid inlet
50 screw

The invention claimed is:

1. An assembly comprising a multi-fiber spinneret comprising at least two nozzles, and a center fluid distributor comprising a single inlet port for a center fluid and at least two capillaries in fluid communication with the inlet port; wherein outlet ports for the center fluid are defined by orifices of the at least two capillaries, the outlet ports being connected to one or more center fluid needles each providing a central orifice of a nozzle of the multi-fiber spinneret, the at least two capillaries being configured to distribute a flow of center fluid provided at the inlet port between the outlet ports in such a manner that the flow rate through all the center fluid needles of the multi-fiber spinneret is the same, wherein the length of each capillary is adjustable to offset differences in flow capacity between the one or more center fluid needles caused by differences in the dimensions of the one or more center fluid needles.

2. The assembly of claim 1, wherein the center fluid distributor comprises two capillaries.

3. The assembly of claim 1, wherein each capillary is arranged within a housing that is configured to be connected to a center fluid inlet of a nozzle of the multi-fiber spinneret.

4. The assembly of claim 3, wherein each housing is configured to be connected to a spinneret insert of the multi-fiber spinneret.

5. The assembly of claim 3, wherein the housing comprises a first housing part arranged in a bore in a basal face of the center fluid distributor, and a second housing part connected to the first housing part and at least partly protruding from the bore.

6. The assembly of claim 5, wherein a sealing element is arranged around the capillary between the first housing part and the second housing part and provides a fluid-tight seal.

7. The assembly of claim 1, wherein an adapter is present between the center fluid distributor and the multi-fiber spinneret, joining the center fluid distributor to the multifiber spinneret.

8. The assembly of claim 1, wherein each capillary of the center fluid distributor is arranged within a housing, a part of each housing protruding from a basal face of the center fluid distributor, and wherein the protruding part of each housing is plugged into a center fluid inlet of the multi-fiber spinneret, the adapter providing sleeves for receiving the protruding part of each housing, and pockets for receiving center fluid inlets of the multi-fiber spinneret.

9. A method of calibrating the assembly of any claim 1, comprising the steps of connecting a feed port for center fluid of the assembly to a source of a constant flow of a liquid; measuring a flow rate of the liquid through each needle of the multi-fiber spinneret; comparing the flow rates measured; and, if the flow rates are not identical, adjusting the lengths of the capillaries in the center fluid distributor to achieve identical flow rates through all needles; measuring flow rates through all needles again to verify that the flow rates are identical; and, if the flow rates still are not identical, repeating the steps until the flow rates through all needles of the multi-fiber spinneret are identical.

10. The method of claim 9, wherein the liquid is water.

11. A process for the production of hollow fiber membranes, comprising simultaneously feeding a polymer solution to a feed port for a polymer solution of the multifiber spinneret, and a center fluid to the feed port for a center fluid of the center fluid distributor of the assembly of claim 1; extruding the polymer solution through outer ring slits of the nozzles of the multi-fiber spinneret and simultaneously extruding the center fluid through the center fluid needles of the multi-fiber spinneret.

12. The process of claim 11, wherein the polymer solution comprises 1) a polysulfone, polyethersulfone, polyarylethersulfone, or any combination thereof; and 2) at least one polyvinylpyrrolidone.

13. The process of claim 11, wherein the center fluid comprises water and N-methyl-2-pyrrolidone.

* * * * *